United States Patent
Alyapyshev et al.

(10) Patent No.: US 10,590,513 B2
(45) Date of Patent: Mar. 17, 2020

(54) METHOD FOR ISOLATING AMERICIUM FROM LIQUID RADIOACTIVE WASTE AND FOR SEPARATING AMERICIUM FROM RARE EARTH ELEMENTS

(71) Applicant: STATE ATOMIC ENERGY CORPORATION "ROSATOM" ON BEHALF OF THE RUSSIAN FEDERATION, Moscow (RU)

(72) Inventors: Mihail Yurievich Alyapyshev, St.Petersburg (RU); Vasily Aleksandrovich Babain, St.Petersburg (RU); Ekaterina Vladimirovna Kenf, g. Uhta (RU); Ludmila Igorevna Tkachenko, St.Petersburg (RU); Mihail Vasilievich Logunov, g. Ozersk (RU); Yuriy Arkadievich Voroshilov, g. Ozersk (RU); Rinat Nailevich Hasanov, g. Ozersk (RU); Andrey Yurievich Shadrin, Moscow (RU); Vitaliy Lvovich Vidanov, Moscow (RU)

(73) Assignee: State Atomic Energy Corporation "Rosatom" On Behalf Of The Russian Federation (RU)

( * ) Notice: Subject to any disclaimer, the term of this patent is extended or adjusted under 35 U.S.C. 154(b) by 207 days.

(21) Appl. No.: 15/573,602

(22) PCT Filed: Dec. 31, 2015

(86) PCT No.: PCT/RU2015/000967
§ 371 (c)(1),
(2) Date: Nov. 13, 2017

(87) PCT Pub. No.: WO2016/182472
PCT Pub. Date: Nov. 17, 2016

(65) Prior Publication Data
US 2018/0066337 A1    Mar. 8, 2018

(30) Foreign Application Priority Data
May 13, 2015  (RU) ................ 2015117911

(51) Int. Cl.
C22B 60/02 (2006.01)
C22B 59/00 (2006.01)
G21F 9/12 (2006.01)
C22B 7/00 (2006.01)
C22B 3/32 (2006.01)

(52) U.S. Cl.
CPC ........ *C22B 60/0295* (2013.01); *C22B 3/0024* (2013.01); *C22B 7/00* (2013.01); *C22B 7/007* (2013.01); *C22B 59/00* (2013.01); *C22B 60/02* (2013.01); *G21F 9/12* (2013.01); *G21F 9/125* (2013.01); *Y02P 10/234* (2015.11)

(58) Field of Classification Search
CPC ..... C22B 60/0295; C22B 59/00; C22B 60/02; G21F 9/12
See application file for complete search history.

(56) References Cited

U.S. PATENT DOCUMENTS

2012/0152059 A1    6/2012 Heres et al.

FOREIGN PATENT DOCUMENTS

| EP | 1664359 A1 | 6/2006 |
| FR | 2810679 A1 | 12/2001 |
| RU | 2335554 C2 | 10/2008 |
| RU | 2544716 C2 | 3/2015 |
| WO | 2005021810 A1 | 3/2005 |

OTHER PUBLICATIONS

English Translation of Written Opinion of the International Searching Authority, dated Jun. 30, 2016, in corresponding International Application No. PCT/RU2015/000967, 4 pages.
International Preliminary Report on Patentability, dated Nov. 14, 2017, issued in International Application No. PCT/RU2015/000967, 5 pages.
International Search Report (with English Translation), dated Jun. 30, 2016, in corresponding International Application No. PCT/RU2015/000967, 2 pages.
V.A. Babain et al., "Extraction of Am and Eu with N,N'-substituted pyridine-2, 6-dicarboxamides in fluorinated diluents", Radiochemistry, Nauka/Interperiodica, MO, vol. 48, No. 4, Jul. 1, 2006, pp. 369-373, XP019406273.

*Primary Examiner* — Melissa S Swain
(74) *Attorney, Agent, or Firm* — Eric L. Sophir; Dentons US LLP

(57) ABSTRACT

The proposed invention relates to processes for extracting and concentrating radionuclides and can be used in radiochemical technologies when treating liquid radioactive waste. The method for isolating americium from liquid radioactive waste and for separating americium from rare earth elements in a single extraction cycle involves joint extraction of americium and rare earth elements from a nitric acid radioactive solution with a neutral solution of an organic extraction agent in a polar fluorinated solvent; washing an obtained organic phase saturated with metals; and selective back extraction of americium, wherein the extraction agent for joint extraction is N,N,N',N'-tetraalkylamide of diglycolic acid, and a solution for back extraction is a composition of 5-20 g/l of a complexone, 5-60 g/l of a nitrogen-containing organic acid and 60-240 g/l of a salting-out agent.

1 Claim, No Drawings

METHOD FOR ISOLATING AMERICIUM FROM LIQUID RADIOACTIVE WASTE AND FOR SEPARATING AMERICIUM FROM RARE EARTH ELEMENTS

CROSS-REFERENCE TO RELATED APPLICATIONS

This application is a US 371 Application from PCT/RU2015/000967 filed Dec. 31, 2015, which claims priority to Russia Application 2015117911 filed May 13, 2015, the technical disclosures of which are hereby incorporated herein by reference.

TECHNICAL FIELD

The proposed invention relates to the processes of extraction and concentration of radio nuclides and can be used in radiochemical technologies when processing liquid radioactive wastes.

BACKGROUND OF THE INVENTION

In up-to-date processes of nuclear fuel radioactive wastes of several compositions are formed. When processing raffinates of PUREX-process it is reasonable to extract americium for its subsequent burning up. One of the most difficult chemical tasks is separation of minor actinides (americium, curium) from accompanying fission products—rare-earth elements (lanthanides and yttrium).

INVENTION DISCLOSURE

There are methods known for extraction of Americium together with rare-earth elements. These are TRUEX [U.S. Pat. No. 5,708,958 (A) B01D11/04]; TRPO [Lui X., Liang J., Xu J./Solv. Extr. Ion Exch., 2004, 22(2) 163-173], published on Jan. 13, 2013; DIAMEX [Courson O., Leburn M., Malmbeck R., Pagliosa G., Romer K., Satmark B., Glatz J. P./Radiochim. Acta., 2000, V. 88 (12), 857-863]; and others.

Disadvantage of the above mentioned methods is simultaneous (collective) extraction of americium and the rare-earth elements.

There is a method known for separation of americium and curium from the rare-earth elements with the use of extraction mixture on the basis of dialkyl-phosphoric acids—TALSPEAK [E. D. Collins, D. E. Benker, P. D. Bailey, et al./Proc. Int. Conf. Global 2005, Tsukuba, Japan, Oct. 9-13, 2005, paper #186; Nilsson M., Nash K. L./Solv. Extr. Ion Exch., 2007, 25(6), 665-701].

Disadvantage of the above mentioned method is low effectiveness of americium and curium extraction from solutions with concentration of nitric acid above 1 mol/L.

There is a method known for separation of americium and curium from the rare-earth elements with the use of extraction mixture of di(2-etholhexyl)phosphate or mono(2-ethylhexyl)-2-ethylhexyl phosphonate/N,N,N,N-tetra-2-ethylhexyl diglycol amide or N,N,N',N'-tetraoktyl-diamide of diglycolic acid in n-dodecane—ALSEP (U.S. Pat. No. 8,354,085 B1 C22B 60/00, published on Jan. 15, 2013).

Disadvantages of the proposed in the method extraction mixture is low extraction ability towards americium. Usage of saturated hydrocarbons (n-dodecane) as a diluent leads to the organic phase that has low capacity by metals. Moreover, usage of solution with high concentration of complexons for re-extraction of americium and curium complicates further processing of re-extracts.

There is a method known for separation of americium from the rare-earth elements with the use of mixtures of N,N,N',N'-tetraoktyl-diamide of diglycolic acid and 1-octanol in hydrocarbonic diluent—innovative SANEX [M. Sypula, A, Wilden, C. Schreinemachers, G. Modolo/Proceedings of the First ACSEPT International Workshop, Lisbon, Portugal, 31 Mar.-2 Apr. 2010, http://www.acsept.org/AIWOproc/AIWO1-PRO8-Sypula.pdf].

Disadvantage of this method is using for selective re-extraction of americium of solution containing sodium nitrate the presence of which complicates further processing of re-extracts.

There is a method known for separation of americium and curium from the rare-earth elements with the use of extraction mixture on the basis of carbamoyl-phosphinoxides—SETFICS [Y. Koma, M. Watanabe, S. Nemoto, Y. Tanaka//Solv. Extr. Ion Exch., 1998, V. 16, N 6, 1357-1367].

Disadvantage of the above mentioned method is impossibility of separation of americium and curium from all rare-earth elements—the product of actinides (III) contains samarium, europium and gadolinium. Usage of saturated hydrocarbons (n-dodecane) as a diluent leads to the organic phase that has low capacity by metals. Moreover, usage of solution with high concentration of sodium nitrate for re-extraction of americium and curium complicates further handling of re-extracts.

Usage of polar fluorinated diluent in SETFICS-process [RU 2273507 C1 B01D11/00, Apr. 10, 2006] increases capacity of the extraction system by metals and prevents formation of third phase.

The closest prior art to the proposed method is a method of simultaneous extraction of americium and the rare-earth elements and their subsequent separation at the stage of re-extraction—modified SETFICS [A. Shadrin, V. Kamachev, I. Kvasnitzky, et al./Proc. Int. Conf. Global 2005, Tsukuba, Japan, October 9-13, paper #129] which is chosen as a prototype method.

The prototype method comprises simultaneous (collective) extraction of actinides and the rare-earth elements from nitric (nitric acid or nitro acid) radioactive solution with neutral organic compound (extraction agent) solution in polar fluorinated organic solvent, washing of saturated with metals organic phase, selective re-extraction of actinides (III) (americium and curium) and re-extraction of the rare-earth metals. Diphenyl-N,N-dibutyl-carbamoyl-methylene-phosphinoxide is used as an extraction agent, meta-nitrobensotrifluoride—as a diluent, and solution composed from 0.05 mol/L complexon and 3 mol/L of salting-out agent—as a solution for re-extraction of actinides (III). Diethylene-triamine-pentaacetic acid is used as a complexon and sodium nitrate as a salting-out agent.

TABLE 1

Results of testing by the prototype method.

| | Concentration in the product, mg/L | | | | |
|---|---|---|---|---|---|
| Element | Initial solution | Raffinate | Washing solution | Re-extract TPE | Re-extract REE |
| Nd | 940 | <0.1 | 6.2 | <5 | 820 |
| Pr | 450 | <5 | 5.8 | <5 | 410 |
| EU | 28 | <1.3 | <1.3 | 90 | <1.3 |
| Sm | 350 | <1.3 | 3.5 | 1310 | 5.5 |
| Gd | 480 | <1.3 | 4.8 | 1720 | <2 |
| Ce | 930 | <1.2 | 5.4 | <5 | 830 |
| Y | 190 | <1.2 | 2.4 | 710 | <2 |
| La | 540 | <1.3 | 2.1 | <1.3 | 470 |

TABLE 1-continued

Results of testing by the prototype method.

| | Concentration in the product, mg/L | | | | |
|---|---|---|---|---|---|
| Element | Initial solution | Raffinate | Washing solution | Re-extract TPE | Re-extract REE |
| Consumption of the product, ml/h | 250 ± 25 | 325 ± 25 | 185 ± 15 | 90 ± 5 | 390 ± 10 |

Disadvantage of the prototype method is incomplete separation of americium and curium from the rare-earth elements. The re-extract of trans-plutonium elements (TPE) contains almost all samarium, europium, gadolinium and yttrium (table 1). Moreover, usage of solution with high concentration of sodium nitrate for re-extraction of TPE complicates further handling of re-extracts.

The problem to be solved by the present invention is ensuring extraction of americium and its full separation from all rare-earth elements in one extraction cycle.

The corresponding technical effect is the extraction of americium from liquid radioactive solutions and its separation from all rare-earth elements in one extraction cycle.

The above mentioned technical effect is achieved in a method for extraction of americium from liquid radioactive wastes and its separation from all rare-earth elements that involves simultaneous (collective) extraction of americium and the rare-earth elements from radioactive nitro-acid (nitric) solution with solution of neutral organic extraction agent in polar fluorinated organic solvent, washing of saturated with metals organic phase, selective re-extraction of americium. This method is notable for using of N,N,N',N'-tetraalkyl-amide of diglycolic acid as an extraction agent and of solution containing 5-20 g/L of complexon, 5-60 g/L nitrogen-containing organic acid and 60-240 g/L salting-out agent as a solution for re-extraction of americium.

In particular case meta-nitrobenzotrifluoride or phenyl-trifluoride-methyl-sulfone is used as a polar fluorinated organic solvent.

In other particular case as a complexon are used aminopolycarbon acids from the range: diethylene-triamine-pentaacetic acid, ethylene-diamine-tetraacetic acid, nitrilotri-acetic acid.

In other particular case nitrogen-containing organic acid is chosen from the range of: aminoacetic acid, picolinic acid, nicotinic acid, α-alanine, β-alanine, valine, norleucine.

In other particular case ammonium nitrate is used as a salting-out agent.

Formulation of the solution for re-extraction of americium is chosen on the basis of optimal concentration of complexon, nitrogen-containing organic acid and salting-out agent in water phase.

If the concentration of complexon is less than 5 g/L, of nitrogen-containing organic acid—less than 5 g/L and of salting-out agent—less than 60 g/L, full separation of americium from all rare-earth elements cannot be achieved.

Increasing of concentration up to 20 g/L of complexon, 60 g/L of nitrogen-containing organic acid and 240 g/L of salting-out agent, is not reasonable.

The following examples illustrate the possibilities of applying the proposed method.

Example 1

Simultaneous extraction of americium and rare-earth elements is carried out as follows. Nitric solution, formulation of which is given in table 2, containing 3 mol/L of nitric acid, comes into contact with solution containing 0.1 mol/L of N,N,N',N'-tetraoctyl-diamide of diglycolic acid in meta-nitro-benzo-trifluoride. Phases are separated and factors (coefficients) of distribution of metals are determined. Distribution factors (coefficients) are presented in table 3.

TABLE 2

Composition of model solution.

| Metal | La | Ce | Pr | Nd | Sm | Eu | Gd | Y | Am |
|---|---|---|---|---|---|---|---|---|---|
| Concentration, g/L | 0.36 | 0.58 | 0.06 | 1.0 | 0.24 | 0.06 | 0.08 | 0.11 | Indicator amounts |

TABLE 3

Factors (coefficients) of distribution of metals.

| Metal | La | Ce | Pr | Nd | Sm | Eu | Gd | Y | Am |
|---|---|---|---|---|---|---|---|---|---|
| D | 2 | 5.6 | 11 | 20 | 70 | 260 | 110 | 700 | 34 |

Example 2

Washing of saturated with metals organic phase is carried out to remove the excess of nitric acid. Extract obtained in the example 1 comes into contact with solution containing 240 g/L of ammonium nitrate and 15 g/L of aminoacetic acid. Phases are separated and factors (coefficients) of distribution of metals are determined. Distribution factors (coefficients) are presented in table 4.

TABLE 4

Factors (coefficients) of distribution of metals.

| Metal | La | Ce | Pr | Nd | Sm | Eu | Gd | Y | Am |
|---|---|---|---|---|---|---|---|---|---|
| D | 5.0 | 15 | 32 | 54 | 172 | 650 | 270 | 1450 | 80 |

Example 3

Solution containing 10 g/L of diethylene-triamine-pentaacetic acid, 120 g/L of ammonium nitrate, 60 g/L of picolinic acid, lanthanum, cerium, praseodymium, neodymium, samarium, europium, gadolinium, yttrium ($10^{-4}$ mol/L of each metal) and indicator amounts of americium, pH=2.05, comes into contact with solution containing 0.1 mol/L of N,N,N',N'-tetraoctyl-diamide of diglycolic acid in meta-nitro-benzo-trifluoride. Phases are separated and factors (coefficients) of distribution of metals are determined. Distribution factors are presented in table 5 and separation factors are presented in table 6.

TABLE 5

Factors (coefficients) of distribution of metals.

| Metal | La | Ce | Pr | Nd | Sm | Eu | Gd | Y | Am |
|---|---|---|---|---|---|---|---|---|---|
| D | 6.5 | 7 | 5 | 4 | 5 | 5.5 | 7.5 | 45 | 0.6 |

TABLE 6

| Separation factors (coefficients). | | | | | | | |
|---|---|---|---|---|---|---|---|
| D(La)/ D(Am) | D(Ce)/ D(Am) | D(Pr)/ D(Am) | D(Nd)/ D(Am) | D(Sm)/ D(Am) | D(Eu)/ D(Am) | D(Gd)/ D(Am) | D(Y)/ D(Am) |
| 11 | 12 | 9 | 6 | 8 | 9 | 12 | 73 |

Example 4

Solution containing 10 g/L of diethylene-triamine-pentaacetic acid, 120 g/L of ammonium nitrate, 12 g/L of picolinic acid, lanthanum, cerium, praseodymium, neodymium, samarium, europium, gadolinium, yttrium ($10^{-4}$ mol/L of each metal) and indicator amounts of americium, pH=2.05, comes into contact with solution containing 0.1 mol/L of N,N,N',N'-tetraoctyl-diamide of diglycolic acid in meta-nitrobenzotrifluoride. Phases are separated and factors of distribution of metals are determined. Distribution factors are presented in table 7 and separation factors are presented in table 8.

TABLE 7

| Factors (coefficients) of distribution of metals | | | | | | | | |
|---|---|---|---|---|---|---|---|---|
| Metal | La | Ce | Pr | Nd | Sm | Eu | Gd | Y | Am |
| D | 17 | 14 | 8.3 | 4.2 | 4.8 | 5.5 | 8.1 | 47 | 0.7 |

TABLE 8

| Separation factors (coefficients). | | | | | | | |
|---|---|---|---|---|---|---|---|
| D(La)/ D(Am) | D(Ce)/ D(Am) | D(Pr)/ D(Am) | D(Nd)/ D(Am) | D(Sm)/ D(Am) | D(Eu)/ D(Am) | D(Gd)/ D(Am) | D(Y)/ D(Am) |
| 24 | 20 | 12 | 6 | 7 | 8 | 12 | 67 |

Example 5

Solution containing 10 g/L of diethylene-triamine-pentaacetic acid, 120 g/L of ammonium nitrate, 7.5 g/L of aminoacetic acid, lanthanum, cerium, praseodymium, neodymium, samarium, europium, gadolinium, yttrium ($10^{-4}$ mol/L of each metal) and indicator amounts of americium, pH=2.05, comes into contact with solution containing 0.1 mol/L of N,N,N',N'-tetraoctyl-diamide of diglycolic acid in meta-nitrobenzotrifluoride. Phases are separated and factors of distribution of metals are determined. Distribution factors are presented in table 9 and separation factors are presented in table 10.

TABLE 9

| Factors(coefficients) of distribution of metals. | | | | | | | | |
|---|---|---|---|---|---|---|---|---|
| Metal | La | Ce | Pr | Nd | Sm | Eu | Gd | Y | Am |
| D | 19.9 | 14.8 | 7.5 | 4.3 | 4.0 | 4.5 | 6.5 | 35.0 | 0.7 |

TABLE 10

| Separation factors (coefficients). | | | | | | | |
|---|---|---|---|---|---|---|---|
| D(La)/ D(Am) | D(Ce)/ D(Am) | D(Pr)/ D(Am) | D(Nd)/ D(Am) | D(Sm)/ D(Am) | D(Eu)/ D(Am) | D(Gd)/ D(Am) | D(Y)/ D(Am) |
| 27.1 | 20.1 | 10.2 | 5.8 | 5.4 | 6.1 | 8.9 | 47.5 |

Example 6

Solution containing 10 g/L of diethylene-triamine-pentaacetic acid, 120 g/L of ammonium nitrate, 12 g/L of nicotinic acid, lanthanum, cerium, praseodymium, neodymium, samarium, europium, gadolinium, yttrium ($10^{-4}$ mol/L of each metal) and indicator amounts of americium, pH=2.05, comes into contact with solution containing 0.1 mol/L of N,N,N',N'-tetraoctyl-diamide of diglycolic acid in meta-nitrobenzotrifluoride. Phases are separated and factors of distribution of metals are determined. Distribution factors are presented in table 11 and separation factors are presented in table 12.

TABLE 11

| Factors (coefficients) of distribution of metals. | | | | | | | | |
|---|---|---|---|---|---|---|---|---|
| Metal | La | Ce | Pr | Nd | Sm | Eu | Gd | Y | Am |
| D | 19.6 | 16.2 | 8.5 | 4.8 | 4.8 | 5.3 | 7.5 | 43.0 | 0.7 |

TABLE 12

| Separation factors (coefficients). | | | | | | | |
|---|---|---|---|---|---|---|---|
| D(La)/ D(Am) | D(Ce)/ D(Am) | D(Pr)/ D(Am) | D(Nd)/ D(Am) | D(Sm)/ D(Am) | D(Eu)/ D(Am) | D(Gd)/ D(Am) | D(Y)/ D(Am) |
| 26.2 | 21.7 | 11.4 | 6.4 | 6.4 | 7/1 | 10.1 | 57.6 |

Example 7

Solution containing 10 g/L of diethylene-triamine-pentaacetic acid, 120 g/L of ammonium nitrate, 15 g/L of ammonium nitrate, lanthanum, cerium, praseodymium, neodymium, samarium, europium, gadolinium, yttrium ($10^{-4}$ mol/L of each metal) and indicator amounts of americium, pH=2.05, comes into contact with solution containing 0.1 mol/L of N,N,N',N'-tetraoctyl-diamide of diglycolic acid in phenyl-trifluoride-methylsulphone. Phases are separated and factors of distribution of metals are determined. Distribution factors are presented in table 13 and separation factors are presented in table 14.

TABLE 13

| Factors (coefficients) of distribution of metals. | | | | | | | | |
|---|---|---|---|---|---|---|---|---|
| Metal | Y | La | Ce | Pr | Nd | Sm | Eu | Gd | Am |
| D | 11.5 | 7.0 | 5.1 | 3.3 | 2.4 | 1.4 | 1.5 | 2.1 | 0.6 |

TABLE 14

| Separation factors (coefficients). | | | | | | | |
|---|---|---|---|---|---|---|---|
| D(La)/ D(Am) | D(Ce)/ D(Am) | D(Pr)/ D(Am) | D(Nd)/ D(Am) | D(Sm)/ D(Am) | D(Eu)/ D(Am) | D(Gd)/ D(Am) | D(Y)/ D(Am) |
| 13 | 9.1 | 5.9 | 4.2 | 2.5 | 2.7 | 3.7 | 21 |

Example 8

Solution containing 5 g/L of diethylene-triamine-pentaacetic acid, 240 g/L of ammonium nitrate, 5 g/L of picolinic acid, lanthanum, cerium, praseodymium, neodymium, samarium, europium, gadolinium, yttrium ($10^{-4}$ mol/L of each metal) and indicator amounts of americium, pH=2, comes into contact with solution containing 0.1 mol/L of N,N,N',N'-tetraoctyl-diamide of diglycolic acid in meta-nitrobenzotrifluoride. Phases are separated and factors of distribution of metals are determined. Distribution factors are presented in table 15 and separation factors are presented in table 16.

TABLE 15

Factors (coefficients) of distribution of metals.

| Metal | La | Ce | Pr | Nd | Sm | Eu | Gd | Y | Am |
|---|---|---|---|---|---|---|---|---|---|
| D | 50 | 58 | 33 | 18 | 15 | 14 | 20 | 115 | 3.6 |

TABLE 16

Separation factors (coefficients).

| D(La)/D(Am) | D(Ce)/D(Am) | D(Pr)/D(Am) | D(Nd)/D(Am) | D(Sm)/D(Am) | D(Eu)/D(Am) | D(Gd)/D(Am) | D(Y)/D(Am) |
|---|---|---|---|---|---|---|---|
| 14 | 16 | 9 | 5 | 4 | 4 | 6 | 32 |

Example 9

Solution containing 20 g/L of diethylene-triamine-pentaacetic acid, 240 g/L of ammonium nitrate, 5 g/L of picolinic acid, lanthanum, cerium, praseodymium, neodymium, samarium, europium, gadolinium, yttrium ($10^{-4}$ mol/L of each metal) and indicator amounts of americium, pH=2, comes into contact with solution containing 0.1 mol/L of N,N,N',N'-tetraoctyl-diamide of diglycolic acid in meta-nitrobenzotrifluoride. Phases are separated and factors of distribution of metals are determined. Distribution factors are presented in table 17 and separation factors are presented in table 18.

TABLE 17

Factors (coefficients) of distribution of metals.

| Metal | La | Ce | Pr | Nd | Sm | Eu | Gd | Y | Am |
|---|---|---|---|---|---|---|---|---|---|
| D | 27 | 20 | 10 | 5 | 4 | 5 | 7 | 41 | 0.9 |

TABLE 16

Separation factors (coefficients).

| D(La)/D(Am) | D(Ce)/D(Am) | D(Pr)/D(Am) | D(Nd)/D(Am) | D(Sm)/D(Am) | D(Eu)/D(Am) | D(Gd)/D(Am) | D(Y)/D(Am) |
|---|---|---|---|---|---|---|---|
| 30 | 22 | 11 | 6 | 4 | 6 | 8 | 46 |

Example 10

Solution containing 10 g/L of diethylene-triamine-pentaacetic acid, 60 g/L of ammonium nitrate, 5 g/L of picolinic acid, lanthanum, cerium, praseodymium, neodymium, samarium, europium, gadolinium, yttrium ($10^{-4}$ mol/L of each metal) and indicator amounts of americium, pH=2, comes into contact with solution containing 0.1 mol/L of N,N,N',N'-tetraoctyl-diamide of diglycolic acid in meta-nitrobenzotrifluoride. Phases are separated and factors of distribution of metals are determined. Distribution factors are presented in table 19 and separation factors are presented in table 20.

TABLE 19

Factors (coefficients) of distribution of metals.

| Metal | La | Ce | Pr | Nd | Sm | Eu | Gd | Y | Am |
|---|---|---|---|---|---|---|---|---|---|
| D | 2.8 | 2.2 | 1.1 | 0/7 | 0.5 | 0.6 | 0.9 | 5.8 | 0.1 |

TABLE 20

Separation factors (coefficients).

| D(La)/D(Am) | D(Ce)/D(Am) | D(Pr)/D(Am) | D(Nd)/D(Am) | D(Sm)/D(Am) | D(Eu)/D(Am) | D(Gd)/D(Am) | D(Y)/D(Am) |
|---|---|---|---|---|---|---|---|
| 28 | 22 | 11 | 7 | 5 | 6 | 9 | 58 |

Example 11

Solution containing 10 g/L of diethylene-triamine-pentaacetic acid, 120 g/L of ammonium nitrate, 9 g/L of α-alanine, lanthanum, cerium, praseodymium, neodymium, samarium, europium, gadolinium, yttrium ($10^{-4}$ mol/L of each metal) and indicator amounts of americium, pH=2.05, comes into contact with solution containing 0.1 mol/L of N,N,N',N'-tetraoctyl-diamide of diglycolic acid in meta-nitrobenzotrifluoride. Phases are separated and factors of distribution of metals are determined. Distribution factors are presented in table 21 and separation factors are presented in table 22.

TABLE 21

Factors (coefficients) of distribution of metals.

| Metal | La | Ce | Pr | Nd | Sm | Eu | Gd | Y | Am |
|---|---|---|---|---|---|---|---|---|---|
| D | 18 | 4.8 | 5.5 | 3.7 | 2.4 | 2.8 | 4.1 | 22 | 0.4 |

TABLE 22

Separation factors (coefficients).

| D(La)/D(Am) | D(Ce)/D(Am) | D(Pr)/D(Am) | D(Nd)/D(Am) | D(Sm)/D(Am) | D(Eu)/D(Am) | D(Gd)/D(Am) | D(Y)/D(Am) |
|---|---|---|---|---|---|---|---|
| 45 | 12 | 14 | 9 | 6 | 7 | 10 | 55 |

Example 12

Solution containing 10 g/L of diethylene-triamine-pentaacetic acid, 120 g/L of ammonium nitrate, 9 g/L of β-alanine, lanthanum, cerium, praseodymium, neodymium, samarium, europium, gadolinium, yttrium ($10^{-4}$ mol/L of each metal) and indicator amounts of americium, pH=2.05, comes into contact with solution containing 0.1 mol/L of N,N,N',N'-tetraoctyl-diamide of diglycolic acid in meta-nitrobenzotrifluoride. Phases are separated and factors of distribution of metals are determined. Distribution factors are presented in table 23 and separation factors are presented in table 24.

TABLE 23

Factors (coefficients) of distribution of metals.

| Metal | La | Ce | Pr | Nd | Sm | Eu | Gd | Y | Am |
|---|---|---|---|---|---|---|---|---|---|
| D | 25 | 6.3 | 6.3 | 4.2 | 2.7 | 3.1 | 4.6 | 26 | 0.5 |

TABLE 20

Separation factors (coefficients).

| D(La)/D(Am) | D(Ce)/D(Am) | D(Pr)/D(Am) | D(Nd)/D(Am) | D(Sm)/D(Am) | D(Eu)/D(Am) | D(Gd)/D(Am) | D(Y)/D(Am) |
|---|---|---|---|---|---|---|---|
| 50 | 13 | 13 | 8 | 5 | 6 | 9 | 52 |

Example 13

Solution containing 10 g/L of diethylene-triamine-pentaacetic acid, 120 g/L of ammonium nitrate, 12 g/L of valine, lanthanum, cerium, praseodymium, neodymium, samarium, europium, gadolinium, yttrium ($10^{-4}$ mol/L of each metal) and indicator amounts of americium, pH=2.05, comes into contact with solution containing 0.1 mol/L of N,N,N',N'-tetraoctyl-diamide of diglycolic acid in meta-nitrobenzotrifluoride. Phases are separated and factors of distribution of metals are determined. Distribution factors are presented in table 25 and separation factors are presented in table 26.

TABLE 25

Factors (coefficients) of distribution of metals.

| Metal | La | Ce | Pr | Nd | Sm | Eu | Gd | Y | Am |
|---|---|---|---|---|---|---|---|---|---|
| D | 22 | 6.7 | 5.4 | 3.5 | 2.2 | 2.6 | 3.9 | 21 | 0.4 |

TABLE 26

Separation factors (coefficients).

| D(La)/D(Am) | D(Ce)/D(Am) | D(Pr)/D(Am) | D(Nd)/D(Am) | D(Sm)/D(Am) | D(Eu)/D(Am) | D(Gd)/D(Am) | D(Y)/D(Am) |
|---|---|---|---|---|---|---|---|
| 55 | 17 | 14 | 9 | 6 | 7 | 10 | 53 |

Example 14

Solution containing 10 g/L of diethylene-triamine-pentaacetic acid, 120 g/L of ammonium nitrate, 13 g/L of norleucine, lanthanum, cerium, praseodymium, neodymium, samarium, europium, gadolinium, yttrium ($10^{-4}$ mol/L of each metal) and indicator amounts of americium, pH=2.05, comes into contact with solution containing 0.1 mol/L of N,N,N',N'-tetraoctyl-diamide of diglycolic acid in meta-nitrobenzotrifluoride. Phases are separated and factors of distribution of metals are determined. Distribution factors are presented in table 27 and separation factors are presented in table 28.

TABLE 27

Factors (coefficients) of distribution of metals.

| Metal | La | Ce | Pr | Nd | Sm | Eu | Gd | Y | Am |
|---|---|---|---|---|---|---|---|---|---|
| D | 17 | 5.5 | 4.4 | 2.9 | 1.9 | 2.1 | 3.2 | 18 | 0.3 |

TABLE 28

Separation factors (coefficients).

| D(La)/D(Am) | D(Ce)/D(Am) | D(Pr)/D(Am) | D(Nd)/D(Am) | D(Sm)/D(Am) | D(Eu)/D(Am) | D(Gd)/D(Am) | D(Y)/D(Am) |
|---|---|---|---|---|---|---|---|
| 57 | 18 | 15 | 10 | 6 | 7 | 11 | 60 |

Example 15

Solution containing 7 g/L of ethylene-diamine-tetraacetic acid, 120 g/L of ammonium nitrate, 12 g/L of picolinic acid, lanthanum, cerium, praseodymium, neodymium, samarium, europium, gadolinium, yttrium ($10^{-4}$ mol/L of each metal) and indicator amounts of americium, pH=2.05, comes into contact with solution containing 0.1 mol/L of N,N,N',N'-tetraoctyl-diamide of diglycolic acid in meta-nitrobenzotrifluoride. Phases are separated and factors of distribution of metals are determined. Distribution factors are presented in table 29 and separation factors are presented in table 30.

TABLE 29

Factors (coefficients) of distribution of metals.

| Metal | La | Ce | Pr | Nd | Sm | Eu | Gd | Y | Am |
|---|---|---|---|---|---|---|---|---|---|
| D | 17 | 12 | 11 | 13 | 15 | 20 | 25 | 12 | 4.3 |

TABLE 30

| Separation factors (coefficients). | | | | | | | |
|---|---|---|---|---|---|---|---|
| D(La)/ D(Am) | D(Ce)/ D(Am) | D(Pr)/ D(Am) | D(Nd)/ D(Am) | D(Sm)/ D(Am) | D(Eu)/ D(Am) | D(Gd)/ D(Am) | D(Y)/ D(Am) |
| 4 | 3 | 3 | 3 | 3 | 5 | 6 | 3 |

Example 16

Solution containing 5 g/L of nitrilotriacetic acid, 120 g/L of ammonium nitrate, 12 g/L of picolinic acid, lanthanum, cerium, praseodymium, neodymium, samarium, europium, gadolinium, yttrium ($10^{-4}$ mol/L of each metal) and indicator amounts of americium, pH=2.05, comes into contact with solution containing 0.1 mol/L of N,N,N',N'-tetraoctyl-diamide of diglycolic acid in meta-nitrobenzotrifluoride. Phases are separated and factors of distribution of metals are determined. Distribution factors are presented in table 31 and separation factors are presented in table 32.

TABLE 31

| Factors (coefficients) of distribution of metals. | | | | | | | | |
|---|---|---|---|---|---|---|---|---|
| Metal | La | Ce | Pr | Nd | Sm | Eu | Gd | Y | Am |
| D | 4.5 | 5.9 | 6.0 | 7.4 | 10 | 15 | 20 | 42 | 3.9 |

TABLE 32

| Separation factors (coefficients). | | | | | | | |
|---|---|---|---|---|---|---|---|
| D(La)/ D(Am) | D(Ce)/ D(Am) | D(Pr)/ D(Am) | D(Nd)/ D(Am) | D(Sm)/ D(Am) | D(Eu)/ D(Am) | D(Gd)/ D(Am) | D(Y)/ D(Am) |
| 1.2 | 1.5 | 1.5 | 2 | 3 | 4 | 5 | 11 |

Example 17

Solution containing 10 g/L of diethylene-triamine-pentaacetic acid, 120 g/L of ammonium nitrate, 12 g/L of picolinic acid, lanthanum, cerium, praseodymium, neodymium, samarium, europium, gadolinium, yttrium ($10^{-4}$ mol/L of each metal) and indicator amounts of americium, pH=2.05, comes into contact with solution containing 0.1 mol/L of N,N,N',N'-tetrabutil-diamide of diglycolic acid in meta-nitrobenzotrifluoride. Phases are separated and factors (coefficients) of distribution of metals are determined. Distribution factors are presented in table 33 and separation factors are presented in table 34.

TABLE 33

| Factors (coefficients) of distribution of rare-earth elements (REE), Am. | | | | | | | | |
|---|---|---|---|---|---|---|---|---|
| Metal | La | Ce | Pr | Nd | Sm | Eu | Gd | Y | Am |
| D | 17 | 9.5 | 5.3 | 4.3 | 3.1 | 3.7 | 5.2 | 28 | 0.45 |

TABLE 34

| Separation factors (coefficients). | | | | | | | |
|---|---|---|---|---|---|---|---|
| D(La)/ D(Am) | D(Ce)/ D(Am) | D(Pr)/ D(Am) | D(Nd)/ D(Am) | D(Sm)/ D(Am) | D(Eu)/ D(Am) | D(Gd)/ D(Am) | D(Y)/ D(Am) |
| 34 | 19 | 11 | 9 | 6 | 7 | 10 | 56 |

These examples demonstrate the possibility of applying the proposed method to separate americium from all lanthanides.

In comparison with the prototype method purification of americium from neutron poisons—samarium, europium and gadolinium is achieved. Moreover, the obtained americium re-extract does not contain indestructible salts.

The invention claimed is:

1. A method for extraction of americium from liquid radioactive wastes and separation of americium from rare-earth elements, comprising:
   (a) simultaneous extraction of americium and rare-earth elements from nitric acid radioactive solution of the radioactive wastes with neutral solution of an organic extracting agent in a polar fluorinated organic solvent selected from meta-nitrobenzotrifluoride and trifluoromethyl phenyl sulphone,
   (b) washing an organic phase obtained from step (a), where the organic phase is saturated with metals, and
   (c) selective back extraction of americium from the solution obtained in step (b), wherein the organic extracting agent used in step (a) is N,N,N',N'-tetraalkyl-amide of diglycolic acid; and
wherein a solution is used for back extraction of americium at step (c) containing:
   5-20 g/L of a complexone selected from diethylenetriamine pentaacetic acid, ethylenediamine tetraacetic acid and nitrilotriacetic acid,
   5-60 g/L of a nitrogen containing organic acid selected from aminoacetic acid, picolinic acid, nicotinic acid, α-alanine, β-alanine, valine and norleucine, and
   60-240 g/L of a salting-out agent being ammonium nitrate.

* * * * *